United States Patent
Konwinski et al.

(10) Patent No.: US 6,273,644 B1
(45) Date of Patent: Aug. 14, 2001

(54) HIGH PRESSURE LIVE SERVICE PIPE RENEWAL APPARATUS AND METHOD

(76) Inventors: Gregory M. Konwinski, 1342 Foxpointe Dr., Sycamore, IL (US) 60178; Dennis D. Price, 22029 S. Borr Ridge Dr., Joliet, IL (US) 60431; Robert E Barrett, 2233 Honeywood Ct., Plainfield, IL (US) 60544; Thomas V. Gobin, 1420 Watson Rd., Sullivan, MO (US) 63080

( * ) Notice: Subject to any disclaimer, the term of this patent is extended or adjusted under 35 U.S.C. 154(b) by 0 days.

(21) Appl. No.: 09/311,988

(22) Filed: May 14, 1999

(51) Int. Cl.[7] .................................................. F16L 55/1645
(52) U.S. Cl. ............................ 405/184; 138/97; 138/98; 264/269; 277/314; 277/602; 277/904
(58) Field of Search ...................... 405/184; 138/97, 138/98; 264/269; 277/602, 904, 314

(56) References Cited

U.S. PATENT DOCUMENTS

| | | | |
|---|---|---|---|
| 1,471,184 | * 10/1923 | Miles ........................................ | 138/97 |
| 2,377,615 | * 6/1945 | Crane ....................................... | 264/269 |
| 2,522,171 | * 9/1950 | Furman et al. ............................ | 138/97 |
| 2,731,041 | * 1/1956 | Mueller et al. ........................... | 138/97 |
| 2,829,675 | * 4/1958 | Mueller et al. ........................... | 138/97 |
| 3,294,121 | * 12/1966 | Powell et al. ............................. | 138/97 |
| 3,568,721 | * 3/1971 | Ross et al. ................................ | 138/97 |
| 3,626,576 | * 12/1971 | Ray ........................................... | 137/15.08 |
| 3,762,446 | * 10/1973 | Tungseth et al. ......................... | 138/97 |
| 3,821,965 | * 7/1974 | Reynolds .................................. | 137/318 |
| 3,845,789 | * 11/1974 | Rohrer ...................................... | 138/97 |
| 4,009,732 | * 3/1977 | Martin et al. ............................. | 138/97 |
| 4,090,534 | * 5/1978 | Martin et al. ............................. | 138/97 |
| 4,268,041 | * 5/1981 | Sovish ...................................... | 277/314 |
| 4,321,740 | * 3/1982 | Davis et al. .............................. | 138/97 |
| 4,377,945 | * 3/1983 | Di Giovnni et al. ..................... | 138/97 |
| 4,390,042 | * 6/1983 | Kucherer et al. ......................... | 138/89 |
| 4,394,202 | * 7/1983 | Thomas et al. ........................... | 138/97 |
| 4,434,816 | * 3/1984 | Di Giovanni et al. ................... | 138/109 |
| 4,437,494 | * 3/1984 | Soper et al. .............................. | 138/97 |
| 4,456,401 | * 6/1984 | Williams .................................. | 138/97 |
| 4,713,870 | * 12/1987 | Szalvay .................................... | 138/97 |
| 5,482,076 | * 1/1996 | Taylor et al. ............................. | 138/97 |
| 5,887,627 | * 3/1999 | Ueda ........................................ | 138/97 |
| 6,024,515 | * 2/2000 | Konwinski et al. ...................... | 405/184 |

FOREIGN PATENT DOCUMENTS

3722622C1 * 10/1988 (DE) .

* cited by examiner

Primary Examiner—Thomas B. Will
Assistant Examiner—Alexandra K. Pechhold
(74) Attorney, Agent, or Firm—Orum & Roth

(57) ABSTRACT

An apparatus and method for inserting a new service pipe into an existing high pressure service pipe that contains a leak, without the necessity of excavation or separately shutting off the supply of the high pressure gas upstream of the effected pipe section. A nosecone coupled with a unique stopper assembly allows a temporary sealing of the high pressure pipe between the main and the leak point, and insertion flow of a sealer through the nosecone, such that the sealer fills the annular space between the new pipe and the old pipe, providing a gas tight permanent seal. The end of the stopper assembly has temporary stop plug that must be drilled open to reestablish the communication of high pressure gas into the new pipe without the chance of flow entering the old pipe.

17 Claims, 5 Drawing Sheets

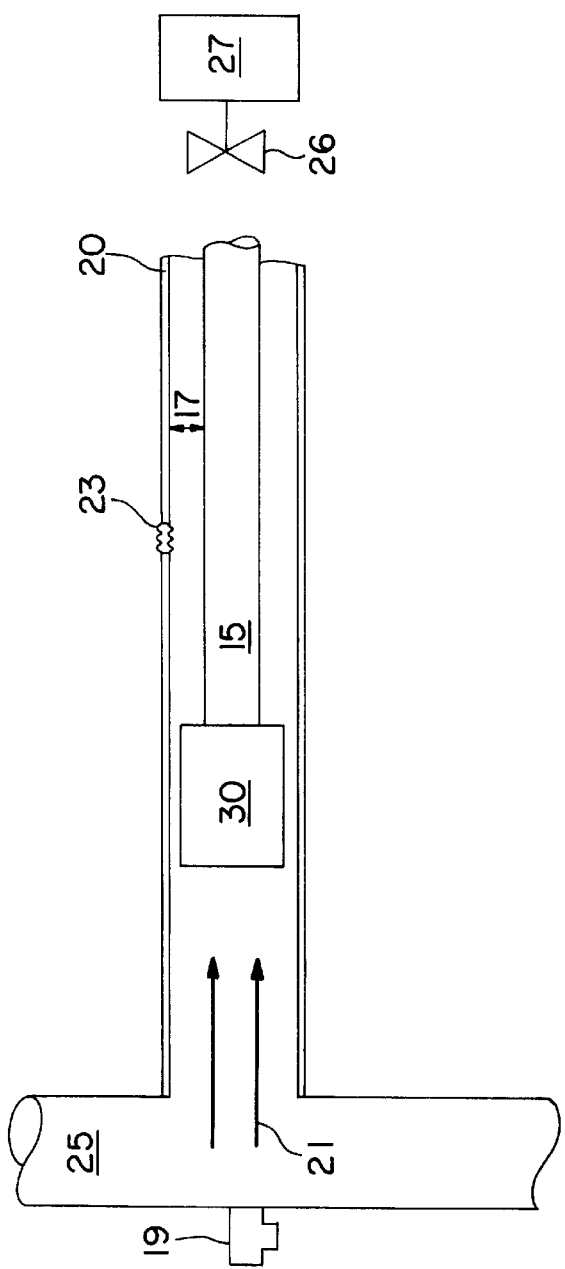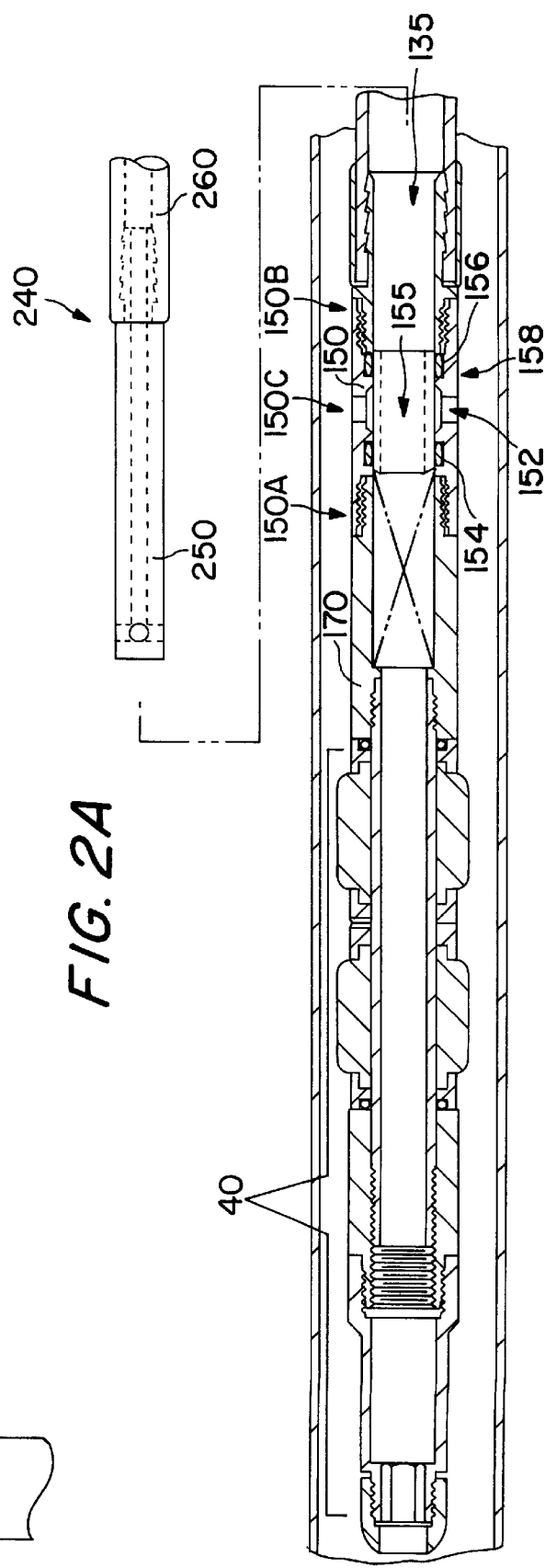
FIG. 1
FIG. 2A

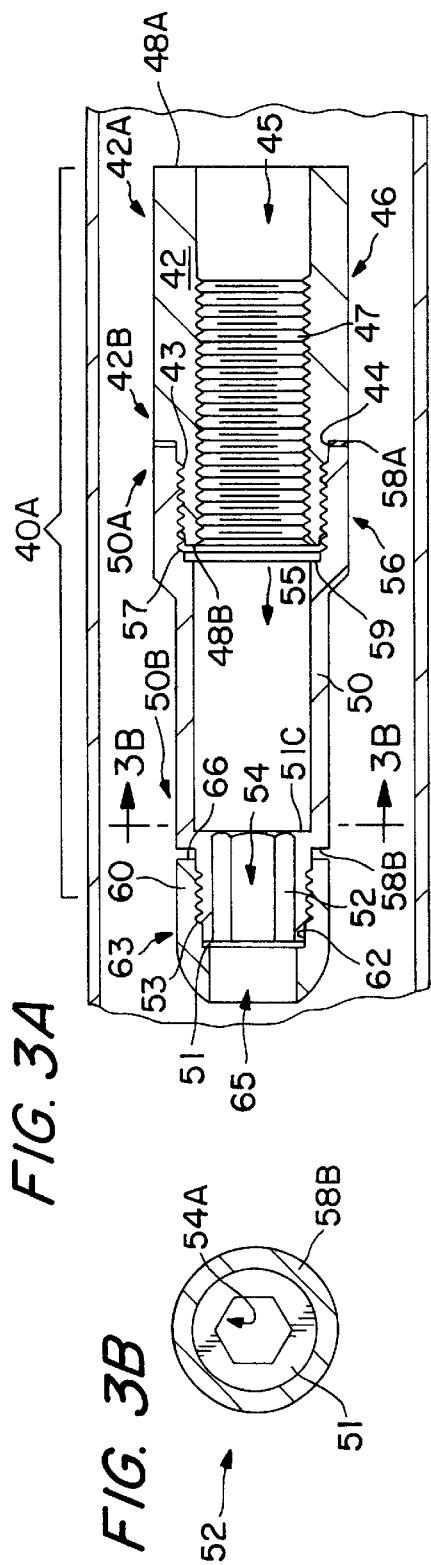
FIG. 3A
FIG. 3B
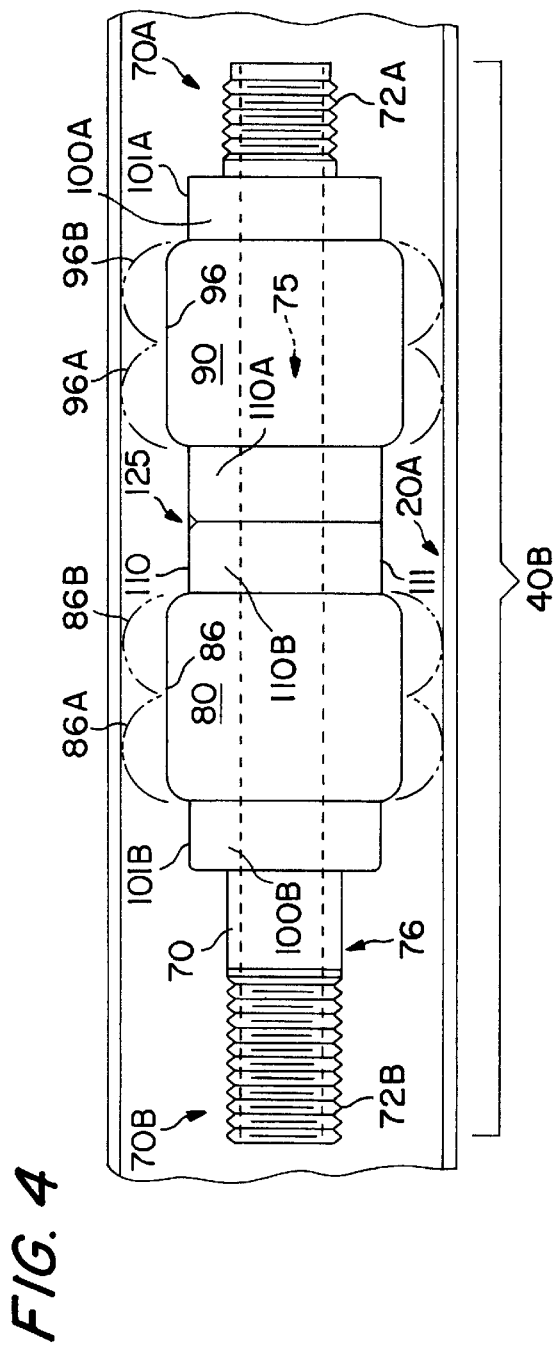
FIG. 4

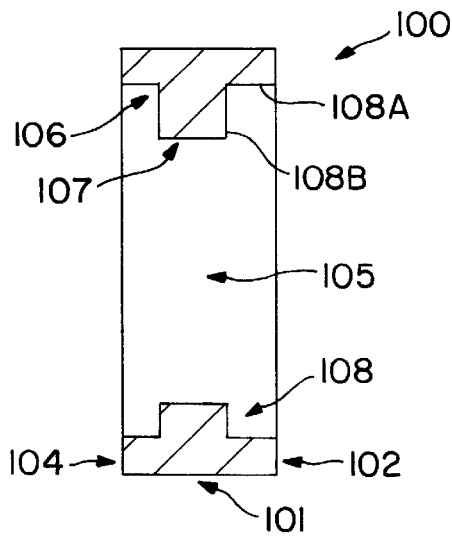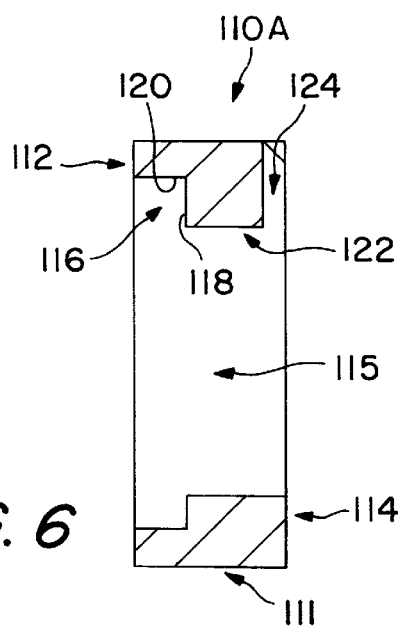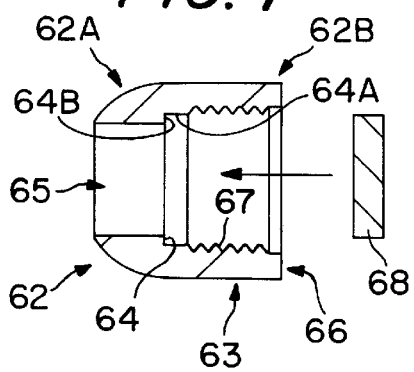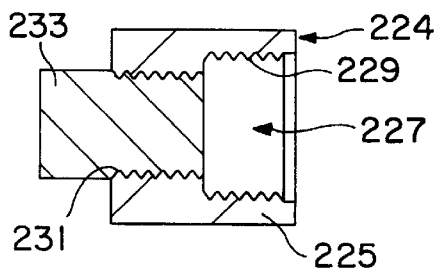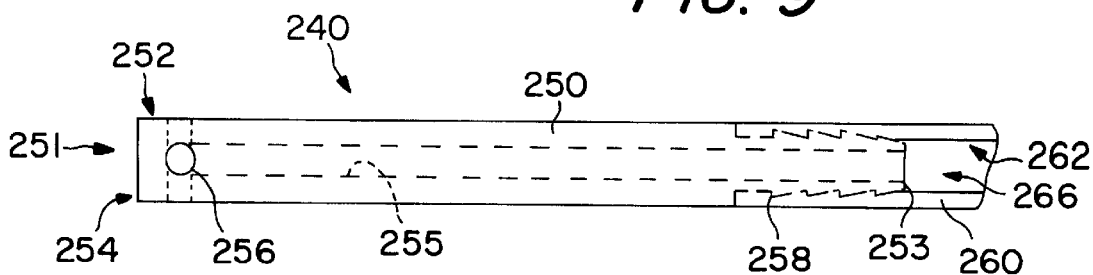

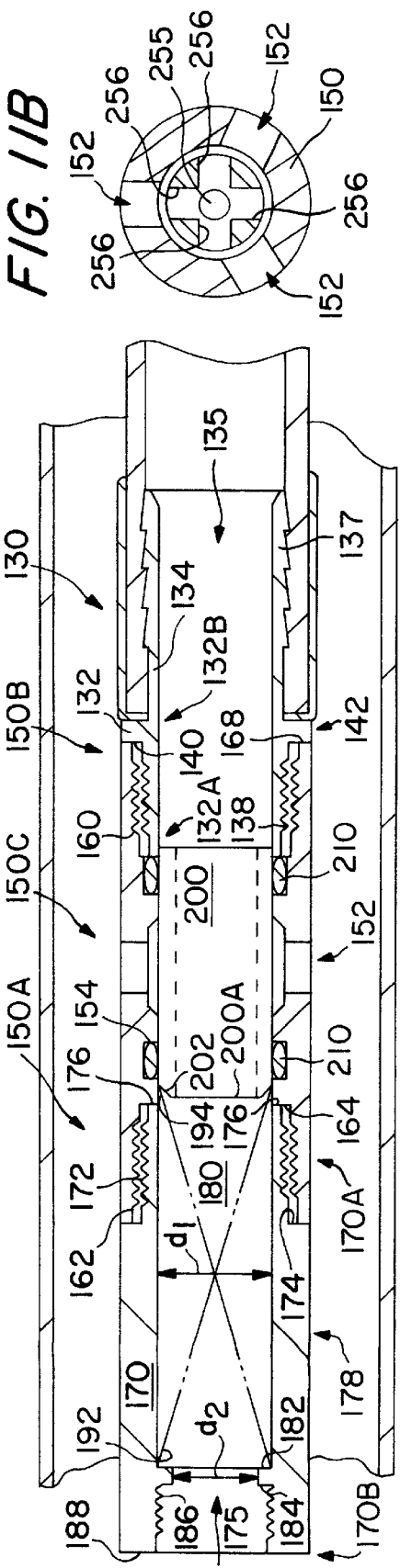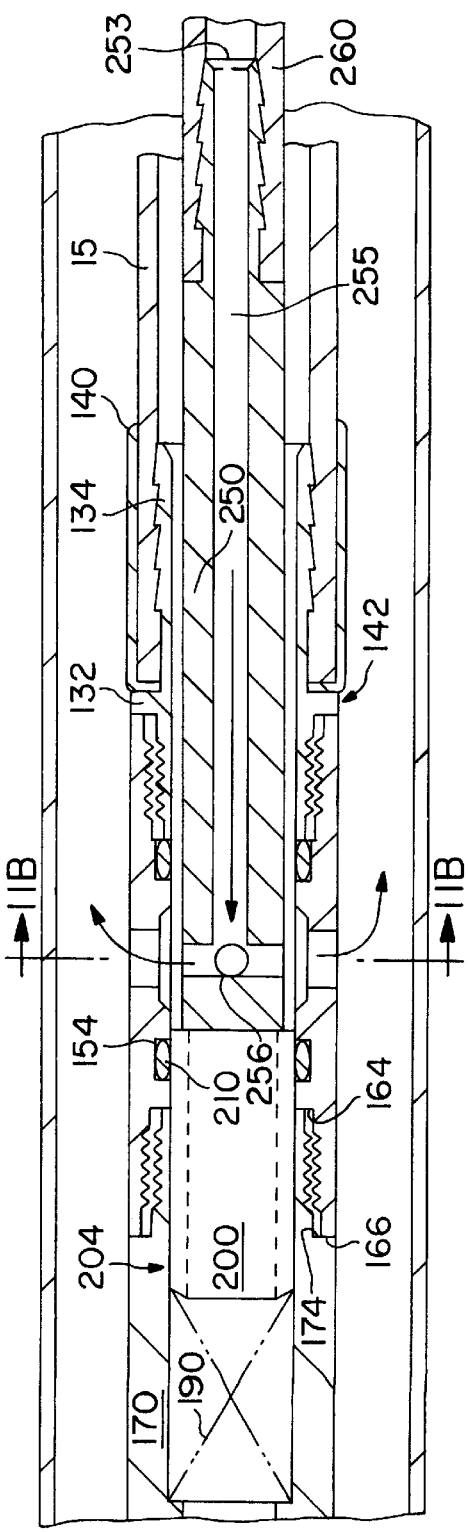

HIGH PRESSURE LIVE SERVICE PIPE RENEWAL APPARATUS AND METHOD

BACKGROUND OF THE INVENTION

1. Field of the Invention

The present invention relates to the repair of high pressure gas or water service pipes which contain a section(s) of leaking or deteriorated pipeline. More particularly, the present invention concerns the insertion of a unique stopper assembly for discontinuing or sealing the flow of the high pressure service into the old section of the high pressure service pipe to be repaired. The stopper assembly further facilitates the insertion of a new, or replacement service pipe within the leaking or deteriorated section, and the pumping of a sealant between the old pipeline and the newly-inserted pipeline. The sealing aspect of the stopper assembly is operated or controlled by a tool means also inserted through the high pressure service pipe, and internally of the stopper assembly. The invention also facilitates pressure testing of the sealed pipeline section prior to returning the high pressure service.

2. Discussion of the Prior Art

Previous servicing and/or replacement of underground high pressure service pipes typically involved excavation of areas adjacent the affected pipe and temporary termination of the flow of gas, either at the point of leakage or at a valve location upstream of the leakage, usually at the connection with the main. Past methods proved to be time consuming and costly, thus it could be appreciated that an alternative method was sought where the replacement of the leaking or deteriorated section could be performed without the need for excavation.

Early improvements involved the insertion of a new pipe section into the old pipe section without the need for excavating, but those early attempts failed to solve higher pressure system sealing. Very early methods involved pumping sealant in between the pipes without the ability to visually confirm a complete filling of the void between the old and new pipes.

Furthermore, prior systems failed to provide a method for pressure testing the repaired section at the seal point before returning the section to service. As these systems typically required the use of a temporary plug in the sealing process wherein the plug was merely removed after sealing stage was completed.

A much more sophisticated service pipe insertion apparatus and method is described in pending U.S. application Ser. No. 08/811,521, to the present inventor. That device solves some of the problems described immediately above, but is limited to use in very low pressure gas systems which are typically held at about six inches of water column pressure. That device provided a hollow nosecone assembly for receiving on one end thereof, the new pipe to be inserted within the deteriorated or leaking old pipe. The nosecone assembly and the new piping was typically fed from the gas meter end, upstream towards the gas main, with the nosecone proper being disposed between the main and the leak. The nosecone assembly included a removable plug that interconnected with the nosecone proper on one end thereof and which received a sealant supply tube on the other end thereof. The sealant supply tube was concentrically received within the newly provided service piping, and thus extended co-extensively to the same location where the new service pipe was inserted (gas meter). At the meter location, a sealant is initially pumped through the sealant tubing, eventually exiting at the end of the plug which was inserted into the nosecone proper. Sealant exit points on the nosecone proper communicate the sealant from the removable plug to the volume of area existing between the old piping and the newly inserted piping. The sealant then reverses its flow direction so that all entrapped air is purged from the volume between pipes, until the sealant again returns to the inlet pumping location. In this way, the entire section of piping from the meter to the nosecone assembly is purged of air and completely sealed. The procedure required a lengthy sealant cure time to pass before continuing, a cured-in-place seal being effected within the nosecone. The removable plug and sealant tubing, being concentrically inserted within the new service piping, is then removed thus re-establishing gas flow from the live side of the assembly into the newly inserted service piping.

The apparatus and method of the present invention on the other hand comprises a modification of the device and method described in U.S. Ser. No. 08/811,521 by providing novel stopping or sealing means for terminating the flow of a higher pressure gas service. Unlike the earlier device which used fins with sealant backing to seal the gas, the device of the present invention utilizes a stopper assembly for creating a two-point sealing of the service line. The apparatus of the present invention also introduces a unique sealant introduction means and methodology for feeding the sealant in between the gap which exists between the old and the new pipes. The present apparatus also provides for pressure testing the system at the seal point, purging air from the system. The present invention does not have a cure time waiting period once the trap door is closed.

SUMMARY OF THE INVENTION

The present invention involves a service line pipe repair assembly for use in a high pressure piping system whereby a new pipeline is inserted into an old pipeline from a gas receiving-destination point, such as the area of a gas meter, without the need to excavate. The apparatus is inserted through the old pipe to a point known to be upstream of the leaking or deteriorated area, and in extreme cases, the insertion may extend the entire length of the old gas service pipe, namely from the meter to the gas supply main. Contiguous with the new pipe is a stopper assembly which forms a seal between the old and the new pipe, thereby terminating live gas service.

The unique stopper assembly effects a seal through internal manipulation of a section thereof, which causes a compression sleeve and nut to compress a pair of spaced elastomeric sleeves. The compression of the sleeves creates a ballooning effect on each sleeve, which in turn seals the area between the apparatus and the old pipe, thereby stopping gas flow. The expanded sleeves undergo a pressure test by means of introducing nitrogen through a weep hole located at the point of seal. Then, a removable plug and sealant tubing, which also forms part of the apparatus, is then inserted into the new service piping, whereby a sealant is introduced into the sealant tubing, to the point where a secondary seal is established. A sealant introduction means allows the sealant to be discharged from the sealant tubing through a series of exit points in the introduction means. Since the stopper assembly is sealing the line service pipe immediately ahead or upstream of the apparatus, the sealant is forced to change direction and travel backwards, but only through the annular space existing between the old pipe and the new pipe. The sealant then discharges near the sealant's point of entry, thereby allowing visual observation and confirmation that the annular space is completely sealed and that all air is purged out of the air space volume existing between the old and new pipes. Thereafter, the sealant tubing and the plug are withdrawn from within the new piping. Pressure testing ensures that the pipe replacement procedure has been successfully performed. A drilling tool is then inserted through the new piping until the drilling tool encounters a pressure disk/stop flange, which is incorporated into the distal end of the stopper assembly. The destructive drilling of the disk/plug opens the flow of high pressure gas to an internal passageway, common within the entire stopper assembly, and since that same passageway is in fluid communication with a coextensive internal passageway of the new piping, high pressure flow is reestablished. The drilling tool is then removed from the new piping and the new piping is then reconnected to the gas meter.

BRIEF DESCRIPTION OF THE DRAWINGS

The following description of the invention will be better understood by reference to the accompanying drawings, wherein:

FIG. 1 is a schematic view highlighting the present invention as inserted within a section of pipe that is leaking or deteriorated;

FIG. 2A is a cross-sectional view of the present invention;

FIG. 3A is a cross-sectional view of the compression portion of the sealing means;

FIG. 3B is an end view of the nosecone receiving end of the compression assembly;

FIG. 4 is a side view of the stopper assembly of the sealing means;

FIG. 5 is a cross-sectional view of a retention collar shown in FIG. 4;

FIG. 6 is a cross-sectional view of one-half of the split-collar shown in FIG. 4;

FIG. 7 is a cross-sectional view of the nosecone assembly;

FIG. 8 is an alternative embodiment of a nosecone assembly;

FIG. 9 is a partial cross-sectional view of the removable sealant assembly;

FIG. 10 is a cross-sectional view of the sealant introduction means in a closed position;

FIG. 11A is a cross-sectional view of the sealant introduction means of FIG. 10 showing the removable sealant assembly feeding sealant between the old and new piping; and FIG. 11B is a cross-sectional view taken along line 11B—11B of FIG. 10.

DETAILED DESCRIPTION OF THE PREFERRED EMBODIMENT

Figure 2B:
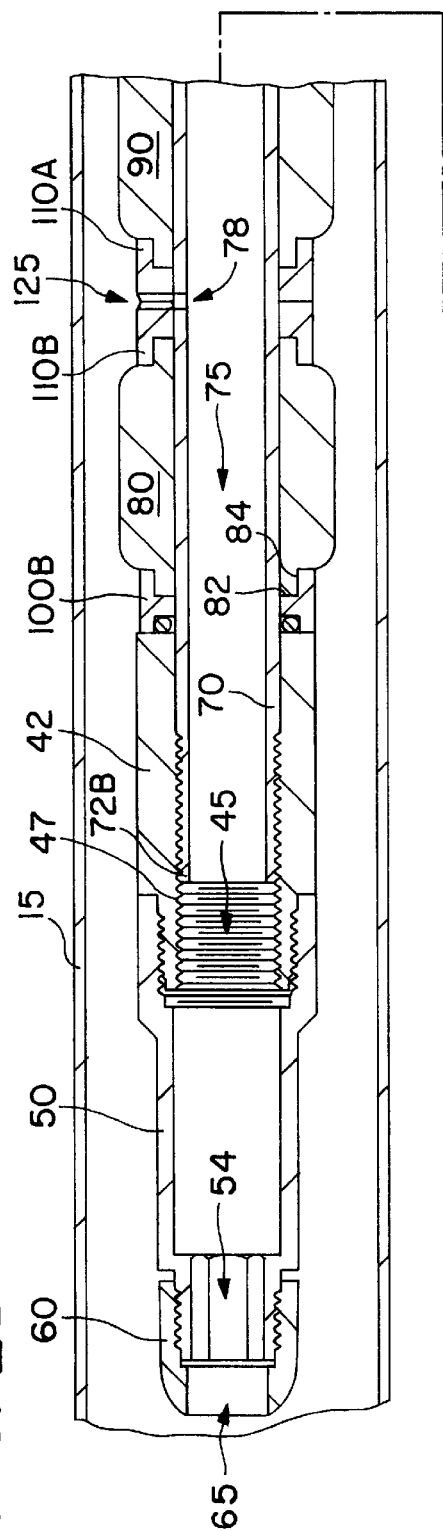
FIG. 2B is an enlarged partially exploded cross-sectional view of the invention shown in FIG. 2A.

Turning attention now to FIG. 1, the concept of the present invention will now be generally described. FIG. 1 shows in a schematic cross section, a portion of an old, leaking or deteriorated pipe 20, that is being fed high pressure fluid from an upstream gas main 25. The fluid being fed can be natural gas, propane, or water, etc., although in the context of describing the invention, it will be assured that a gas is being fed through the pipeline. The flow of gas is represented by the heavy arrows designated as 21, which flows from the main towards meter 27. A leak designated at 23 can represent a single gas exit point through old pipe 20, or it can represent a section of deteriorated piping which needs replacement from leak point 23, back to meter 27.

In order to avoid excavating the area surrounding leak 23 or shut-off tee 19, the apparatus 30 of the present invention is inserted into old pipe 20 once it has been disconnected at an appropriate above-ground location, usually at inlet valve 26 to meter 27. A gland arrangement which is well known to those in the art, is attached to the old piping at the disconnect point temporarily sealing the out-rush of the high pressure fluid. The gland arrangement also facilitates the insertion of the apparatus of the invention into the old pipeline so that the apparatus can be inserted beyond leak 23. Those in the art know how to detect the apparatus respective leak 23 without being able to actually see the apparatus during insertion. It is obvious that the apparatus must be located upstream of leak 23, towards gas main 25 in order to prevent gas flow through leak 23.

The apparatus of the invention as shown in FIG. 1 generally includes a sealing means (not shown) for creating a seal within piping 20, thereby terminating the gas flow 21 to leak 23, and means for retaining thereon (not shown) a new provision of piping 15, which replaces the old piping. Those elements will be explained in greater detail below, but it is important to understand that all components comprising the invention will have a respective centrally located, axially disposed passageway which forms a continuous passageway through the apparatus. As will also be explained later, a removable sealant assembly is inserted into new piping 15 after the gas flow is terminated in order to facilitate sealing the volume of annular space 17 existing between the old and new piping 20 and 15. The area being sealed generally extends from apparatus 30, backwards, all the way to gas meter 27, once a sealant is pumped therebetween.

Referring now to FIGS. 2–4, the sealing means 40 of the present invention will now be explained in greater detail. The sealing means 40 of the present invention serves two purposes. First, it functions to terminate the flow of high pressure gas traveling towards the leak or deteriorated piping, and secondly, it serves as a means for later reestablishing gas service once the new pipeline has been installed, sealed, and pressure tested. A related aspect of the sealing means is to facilitate the sealing of the annular space between the old and new piping, as well as pressure testing, as will be explained later. In FIG. 2A, the sealing means 40 is generally shown with respect to the entire apparatus of the invention being inserted within the deteriorated pipeline 20 at a desired location, while FIG. 2B shows the invention in larger scale. FIG. 3A illustrates a first portion 40A of the sealing means, which will also be referred to hereinafter as the compression assembly. The compression assembly is comprised of a compression nut 42 attached to a compression sleeve 50, which in turn receives a nosecone assembly 60.

The compression nut 42 has a generally cylindrically shaped body which has a proximal end 42A and a distal end 42B and the axially disposed, centrally located passageway 45 extending completely through the compression nut 42. At the distal end 42B, the central passageway is partially provided with internal threads 47, extending from end face 48B, inwardly of passageway 45, towards end face 48A. The external surface 46 of compression nut body 42 is also partially threaded on the same end 42B, wherein external threads 43 originate from end face 48B and extend towards end 42A, terminating at shoulder 44. As FIG. 3A illustrates, external threads 43 of compression nut body 42 threadingly engage a complementary set of threads 57 formed internally of end 50A on compression sleeve 50.

Compression sleeve 50 is threadingly coupled with nut 42 through the thread pair 43, 57, which are reverse, or left hand threads, rather than standard right hand threads. The importance of using reverse threads will be understood later when the operation of the sealing means is provided. Sleeve 50 is threaded onto nut 42 until end face 58A abuts shoulder 44 of compression nut 42, whereby distal end face 48B also engages shoulder 59 which is formed at the terminal end of internal threads 57. It is of consideration to realize that the central passageways 45, 55 of each member 42, 50 are coextensive and continuous when said members are coupled, as are outside surfaces 46 and 56.

On the opposite end 50B of sleeve 50, a stub 52 projects outwardly from terminal end face 58B and is provided with external threads 53 for receiving thereon, nosecone assembly 60. The external threads 53 extend from terminal end face 58B to end face 51 on stub 52. The end face 58B also defines a shoulder for receiving thereon, nosecone assembly 60. When nosecone assembly 60 is threadingly mated to stub 52, nosecone base surface 66 abuts end face 58B, wherein outside surfaces 63 and 56 coextensively align together.

Turning attention now to FIG. 7, the preferred nosecone assembly 60 will now be described in greater detail. As seen, the assembly is comprised of end cap 62 and an insertable plastic pressure disk 68. The end cap 62 includes a tip 62A and a base end 62B, and an axially disposed, centrally located passageway 65 extending therebetween. Internally of said cap, a portion of the passageway is threaded, namely from base end surface 66 to shoulder 64. The shoulder is of a width or extent that can receive thereon, the pressure disk 68. Once received, threads 67 of end cap 62 are threadingly engaged with external threads 53 on stub 52 until end surface 66 abuts terminal end face 58B on compression sleeve 50. During tightening of end cap 62, the pressure disk is tightly compressed between the surfaces 64A, 64B defining shoulder 64, and end face 51 of stub 52. The disk undergoes plastic deformation such that necked down portions of disk 68 form a gas-tight seal between the above-mentioned surfaces. More importantly, plastic pressure disk 68 seals the end face 51 of stub 52 from the high pressure gas service which exists within passageway 65 on the tip end side of pressure disk 68 prior to sealing. FIG. 3B shows the construction of end face 51 of stub 52, and it is seen that stub 52 is provided with hexagonally shaped port 54 that is axially disposed, centrally of the stub, and is defined by the surfaces 54A. By sealing this port 54, high pressure gas is prevented from entering the internal passageways 55 and 45 of the compression assembly through passageway 65, and this is very important to the operation of the sealing means, as will be fully understood once the second portion of the sealing means is described. The significance of providing an hexagonally-shaped port is operationally tied to a complementary shape of a tightening tool (not shown) that interfaces within port 54, the tool used for effecting the operation of the sealing means of the invention.

An alternative type of nosecone assembly is envisioned and is illustrated in FIG. 8. Like the assembly shown in FIG. 7, it includes an end cap 225, that is provided with internal central passageway 227 which is provided with a first set of threads 229, and a second set of threads 231. The assembly also includes a solid, plastic plug 233 which has complementary threads for engaging threads 231 to thereby seal passageway 227 when mated. The end cap 225 is threaded by threads 229 to threads 53 of stub 52, until end face 224 abuts end face 58B. Like disk 68, the plastic plug prevents high pressure gas from entering internal passageways 55 and 45 of the compression assembly.

Turning attention now to FIG. 2A and FIG. 4, the second portion 40B of the sealing means will now be described. The second portion of the sealing means is referred to herein as the stopper assembly and it is comprised of a hollow shaft 70 which receives thereon, a pair of spaced, distendable elastomeric members which seal the annular space 17 existing between old pipeline 20 and the apparatus of the invention. The shaft is provided with an axially disposed, centrally located passageway 75 which extends the entire extent of shaft 70, between proximal end 70A and distal end 70B. As seen, ends 70A and 70B are each provided with threads 72A, 72B. Threads 72B threadingly mate with internal threads 47 of compression nut 40. When assembled as such, internal passageway 75 is in communication with internal passageway 45 and 55 of the compression assembly.

The first and second distendable elastomeric membranes 80 and 90, are laterally spaced from each other by split collar 110 and are braced on each respective end by end collars 100A and 100B. The end collars 100A and 100B are identical in all aspects, therefore, only one member will be described in detail although it should be understood that both end collars function exactly the same, as will now be described. Generally, each end collar will be referenced as member 100.

FIG. 5 shows one of the end collars 100 in cross-section, and it is provided with an axially disposed, centrally located throughbore 105 delimited by internal surface 107. Each of the end collars 100 is frictionally slid over outside surfaces 76 of shaft 70, necessarily dictating that throughbore 105 is preferably of an inside diameter that is closely matched to the outside diameter of shaft 70 so as to avoid oscillating movement of the collars along shaft 70. Also seen is the large undercut 108 formed in front face 102 for receiving one of the end faces 82, 84 or 92, 94 of either of the elastomeric distendable members. Each of the surfaces 108A and 108B which define undercut 108, hold and restrain the end face of the distendable member during operation of the sealing means and prevents the ends of members 80, 90 from riding over the outside surface 101 of each end collar. That functional aspect of undercut 108 will become clearer during the operational description of the sealing means, which follows below. The second end face 104 of collar 100 is provided with a second and relatively smaller undercut 106 for receiving therein an O-ring (not shown), which creates a seal between the end collars 100 and outside surface 76 of shaft 70 when each of the collars are slid onto shaft 70.

Turning to FIG. 6, one-half of the split-collar 110 is shown in detail from the pair first shown in FIG. 4. Since each half 110A and 110B are mirror images of the other, only one-half will be described in detail although like character numbers will apply to both halves.

The half collar 110A is provided with an axially disposed, centrally located throughbore 115 that is delimited by inside surface 122 which contacts outside surface 76 when frictionally slid onto shaft 70. The outside face 112 is provided with annular undercut 116, which is defined by base surface 118 and wall surface 120. Similar in purpose to the annular undercuts provided in the end collars, undercut 116 holds and prevents an end face from each of the distendable members from sliding over and onto the outside surface 111 during operation. The opposite and inside face 114 of each split collar 110 is provided with a radially disposed channel 124 that extends perpendicular to throughbore 115 between surfaces 122 and 111. When each half collar is assembled together, the respective channels 124 on each half collar, forms a full weep hole 125, but it should be understood that the weep hole 125 does not extend through the entire split-collar; it only exists on half of the collar. Referring now to FIG. 2B, it is seen that weep hole 125 is in communication with radial hole 78 of shaft 70, which in turn is in communication with internal, central passageway 75. The weep holes 125 and 78 are provided in the apparatus of the invention for pressure testing purposes, and those tests will be explained as part of the operation of the invention, which follows later.

Turning now to FIGS. 2A, 2B, 10, and 11A, the sealant introduction means and the receiving and retaining means will now be explained in greater detail. As FIG. 2A generally shows, the means for receiving and retaining the new pipeline 15 that is to be inserted within the interior of the old pipeline is illustrated at 130. More specifically, FIGS. 2B, 10 and 11A show the receiving and retaining means is comprised of coupling housing 132 having a top and a bottom end 132A, 132B, with the top end further including a projecting arm 134 which has an outside surface 136 formed as barbs 137 for frictionally receiving thereon the end of a new pipeline 15. FIG. 11A shows arm 134 receiving the interior of new piping 15, with annular swaging member 140 ensuring that pipeline 15 is retained on housing 132, although once new pipeline 15 is inserted over barbs 137, it usually is not necessary to provide swaging member 140. The other end is shown here as having threads 138 formed on part of the housing outside surface, for insertion into the means for providing sealant. In another embodiment of the receiving/retaining means, it is envisioned that bottom end 132B not have the outside threads, but rather be formed with inside threads generally in the same location as those shown. In that way, if circumstances are such that the sealant material will not be used to seal the annular space 17, the receiving/retaining means can be threadably connected directly to the threads 72A formed on proximal end 70A of shaft 70. In that way, the sealing means can still be used to terminate gas flow into the old, leaking section of pipeline, while simultaneously providing the new pipeline as the replacement for the old service line. Since the sealing means is never removed from the pipeline, the new pipeline attached to it through the receiving/retaining means, will be automatically established. However, those circumstances where a sealant material will not be provided are extraordinary, and therefore the embodiment as shown in FIG. 11 will be preferred.

As FIG. 2A illustrates, the receiving and retaining means 130 is threadingly connected to a first component of the sealant introduction means referred to as the sealant dispersion receptacle 150. Also shown is a second component 170, connected to the first component, and finally, the figure illustrates a third component 240, a removable sealant supply assembly ready to be inserted wholly or partially within the first and second components. In the blown-up illustration of FIG. 2B, only the first and second components will be described in greater detail.

Figure 2C:
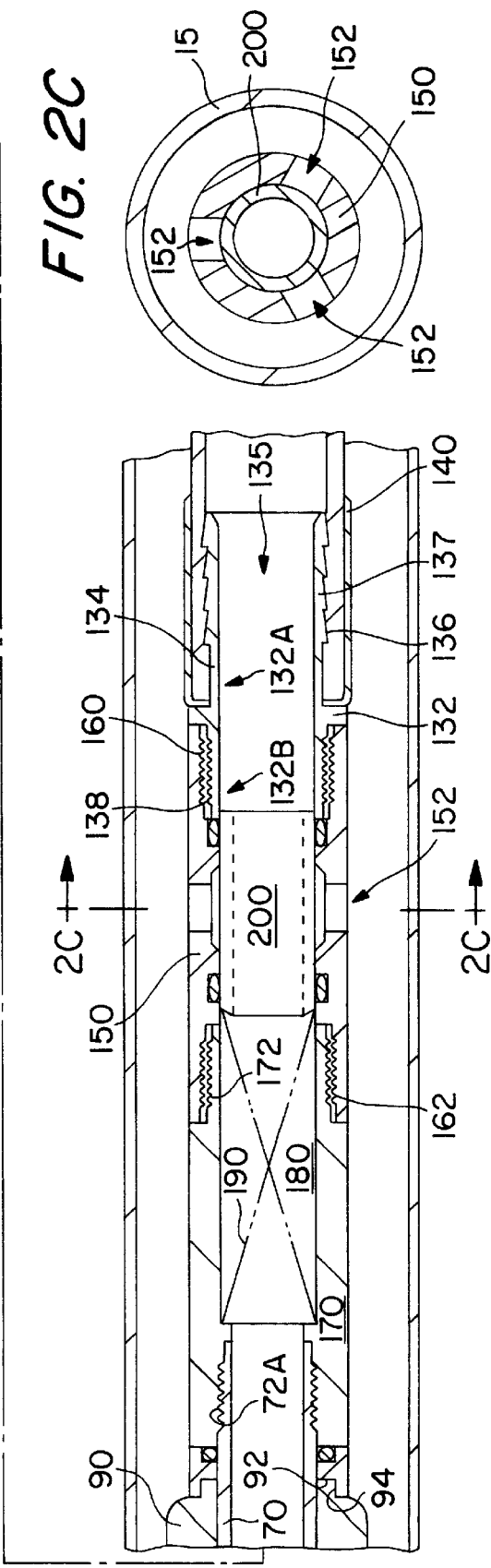
FIG. 2C is a cross-sectional view taken along line 2C—2C of FIG. 2B, emphasizing the location of the sealant exit ports.

The first component 150 is comprised of the sealant dispersion receptacle and it corresponds to an outside container which has an inside end 150A and an outside end 150B, and includes an axially aligned, centrally disposed passageway 155 extending therebetween. At the midsection 150C of receptacle 150, there exist radially oriented ports 152 extending from central passageway 155 to outside surface 158. As FIG. 2C shows, there are at least three ports 152 formed at 120° intervals from each other. The number of ports can be increased to four, but it is not envisioned that more than that be provided since there is a balance between providing enough ports to expediently allow the flow of a sealant material therethrough, versus the possibility of these ports creating a possible leak location during pressure testing. This tradeoff will be understood once operation of the invention is described.

Internally provided within receptacle 150 are two annular grooves 154 and 156, axially displaced from each other and equally spaced from midpoint 150C. The groove 156 is the delimiting end of internal threads 160 formed inside passageway 155 at end 150B. The opposite end 150A also is provided with internal threads 162 along passageway 155, however these threads do not continue to the annular groove 154, but rather terminate at and form the shoulder 164. The shoulder 164 abuttingly receives end face 176 of the second component when portions 150 and 170 are connected together by threadingly joining threads 172 with threads 162. The annular grooves 154 and 156 receive O-rings therein which are inserted from respective ends 150A, 150B prior to connection of component 150 to 170. The O-rings which are inserted into grooves 154 and 156 are of the same diameter and thickness, and form a contact seal with a valve gate which controls the flow of sealant through ports 152 when the sealing function is performed, as will be understood shortly.

When receiving/retaining means 130 is threadingly connected to receptacle 150 by threading threads 138 into threads 160, the central passageway 155 of sealant dispersion receptacle 150 is in communication with the central passageway 135 of the receiving and retaining means 130, and outside surface 142 is coextensive with outside surface 158 after shoulder 140 abuts against end face 168.

Another portion of the sealant introduction means is inner receiver housing 170. Like the outside container portion, the inside container portion 170 has an inside end 170A, and outside end 170B, and an outside surface 178. Internally of receiver housing 170, there is a chamber 180 defined by a bore of diameter $d_1$, which extends between end face 176 and ledge 182. There is also an axially aligned, centrally disposed passageway 175 extending between end face 188 and chamber 180; passageway 175 and chamber 180 are in communication with each other. The inside end 170A of passageway 175 is internally provided with threads 186 which extend between end face 188 and internal shoulder 184.

The passageway 175 has a relatively smaller diameter $d_2$ compared to diameter $d_1$ of chamber 180. As mentioned above, external shoulder 174 abuts internal shoulder 164 of sealant dispersion receptacle 150 when threads 172 are threadingly mated together with threads 162.

The chamber 180 of receiver housing 170 receives therein a compression spring 190, as best seen from viewing FIG. 10. A bottom 192 of spring 190 rests on internal ledge 182, while top 194 abuts against a flange 202 of valve gate 200. The valve gate is formed from a hollow piece of tubing, and the bottom end 200A is flarred outwardly to form flange 202. The combination of spring 190 and valve gate 200 forms the sealant flow control valve, which controls the introduction of a sealant material into air space 17 between the old and new pipelines.

In a normal resting position, the sealant control valve closes radial ports 152 in the sealant dispersion receptacle, where outside surface 204 is in very close approximation with the wall surface defining internal passageway 155 to effectively seal ports 152. As a back-up system, the O-rings 210 frictionally contact outside surface 204 and fluidly seal each end of the valve gate.

Turning attention to FIG. 11A, the sealant control valve is seen in a compressed position, wherein the compression spring 190 is fully compressed and the position of valve gate 200 has been moved leftward in the figure, such that the left-most O-ring within groove 154, still contacts against outside surface 204, thereby creating a fluid seal at that point of contact.

FIG. 11A also shows that compression of spring 190 is the result of the third member of the sealant introduction means, the removable sealant assembly 240, which was initially introduced in FIG. 2A. As FIG. 2A shows, the removable sealant assembly 240 is inserted into new pipeline 15, and because the respective central passageways 135, 155 and 175 are all in axial communication, the assembly 240 is readily inserted and axially slid from the terminal end of the apparatus, towards the proximate end thereof, eventually contacting the gate 200 of the sealant control valve.

The removable sealant assembly 240 is comprised of two pieces, namely a cylindrical plug 250 and a sealant supply tubing 260 attached to the plug, each of which is illustrated in FIGS. 2A, 9, and in an exploded position in FIG. 2A. The cylindrical plug 250 has an axially disposed, centrally located blind bore 255 therein which extends from that end 251, towards end 253, for communicating a sealant material therethrough, with the sealant eventually being forced out of the plurality of radially disposed holes 256 in fluid communication with blind bore 255. As seen in FIG. 9, sealant supply tubing 260 is comprised of an elastomeric or plastic material having a first, open end attached to a second end 253 of plug 250 by sliding the inside surface 262 of the tubing over serrated edges 258. The outside surface 266 of tubing 260 and outside surface 252 of plug 250 are coextensive when assembled so that sealant assembly 240 does not catch on any of the internal surfaces of the retaining means and sealant introduction means, as will become evident as the sealing process is explained below.

The operation of the invention will now be described with respect to replacing an old, deteriorated section of piping with a new section, sealing the air volume between the sections, and then pressure testing the system before returning gas service.

First turning to FIGS. 1 and 2A, the initial step begins with insertion of the apparatus of the invention 30 into the old pipeline 20 from a disconnect point at the gas meter 27. A gland arrangement (not shown) is attached to the open end of the old pipeline just prior to insertion, and it temporarily stops the flow of escaping gas. It also facilitates feeding the apparatus to a point beyond the leak 23, keeping in mind that the new piping 15 is attached to the apparatus such that as the apparatus is fed inwardly, new piping is simultaneously being fed inwardly too.

Once at the desired location, a tightening tool is then fed through the new pipeline 15, and into the body of the apparatus of the invention. Because the receiving and returning means, the sealant introduction means, and the sealing means all have a coextensive, axially arranged, central passageway extending communicatively together, the tightening tool is readily fed internally into engagement with stub 52, which is provided with the hexagonally-shaped port 54 centered therein. The tool likewise has a hexagonally-shaped head, which mates within port 54. The length of the tool head is predetermined so as to extend the entire length of the port once inside. Proper alignment and insertion between the hexagonal port and the tool head is easily determined by an operator at the meter end of the new pipeline. An operator of the tool will feel the feed of the tool stop, since the tool head initially stops against internal face 51C. Upon slow rotation of the tool, he can then feel the hexagonal tool tip enter the port 54, since the feed of the tool will again continue in the feed direction, but ever so slightly.

Assuming now that the tool head is fully inserted within the port 54, an operator will further manipulate the tool by rotating it in a counter-clockwise direction. Since the compression nut 42 and compression sleeve 50 are fastened together in a face-to-face relationship (end face 58A engaging shoulder 44), these components will be rotated in unison in a counter-clockwise direction. As FIGS. 2B and 4 illustrate, threads 72B of shaft 70 receive and mate with threads 47 of compression nut 42. Since the reverse thread action of threads 57 and 43 keep the compression sleeve and nut together as one operating unit, the effect of reverse thread pairs 47 and 72B is to move the compression assembly in a direction towards distendable members 80, 90. Since members 80, 90 are held between end collars 100 and split-collar 110, and since these members are slidably resting on outside surface 76 of shaft 70, they also will move in the same direction as the compression assembly. However, since the sealant introduction means 150, 170 and the retaining and retention means 130 are effectively fastened to end 70A of shaft 70 through threading engagement with standard threads 72A, those components act as a stop against the further sliding of members 80, 90, 100 and 110. Continued movement of the compression assembly causes deformation of distendable members 80, 90, such that each member forms into the double-humped configuration seen in FIG. 4. Each member forms a gas-tight seal 86A, 86B, 96A, 96B where each respective outer surface 86, 96 contacts inside pipe surface 20A of old pipeline 20. Although FIG. 4 slightly exaggerates the distances between surfaces 86, 96 and surface 20A when in their initial state, the travel provided on threads 72B is predetermined to ensure that each distendable member 80 and 90 will form the double seals 86A, 86B, 96A, 96B on each member. Amazingly, the provision of undercuts 108 with each end collar 100A, 100B and with split-collar 110 contributes to the formation of the symmetrically-shaped double humps on each member 80, 90. Because the undercuts securely hold the respective end faces 82, 84 and 92, 94 of each member within the respective collars, and preventing the end faces from overriding onto the outside surfaces 101A, 101B and 111 of the respective collars, a uniform compression of each distendable member occurs, leading to the double humped configuration.

The next operational step in utilizing the present invention is to ensure that a gas-tight seal is in fact being made at sealing points 86A, 86B, 96A, 96B. This is done by first removing the tool from within new pipeline 15 and then introducing pressurized air into the new pipeline and into the central passageway of the apparatus, such that the pressurized air exits radial weep hole 125 in split-collar 110. It should be appreciated from viewing FIG. 4 that it is the air volume of the space existing between the leftmost seal points 86A, 86B and the rightmost seal points 96A, 96B that is pressurized to a level higher than the line pressure of the gas service. Typically, air at 90 psig is introduced and then held for a period of at least 15 minutes, during which time, a drop in pressure would indicate that either of the distendable members is not sealing. If the leftmost seal was failing, the pressure gauge would drift downwardly until the service line pressure is reached and then an operator would be able to detect the smell of natural gas at the header arrangement used for introducing the pressurized air. If the rightmost seal was leaking, the operator would again notice the gauge pressure falling. This time however, he would not detect the smell of gas at the introduction header during complete bleed down of the new pipeline.

If a gas-tight seal is obtained, then the gauge pressure will remain steady during the entire test period. If it does not, the tool used for effecting the seal can be reintroduced into the hexagonally-shaped port 54, in order to loosen the apparatus and move it to a second location where the seal can again be re-established.

Once a gas-tight seal is established, the old pipeline is now temporarily sealed off from the gas main. The next step is to then simultaneously purge all entrapped air from between the old and new pipelines, and to fill the area between said pipelines with a quick-set sealant material. Turning now to FIGS. 2A, 10, 11A and 11B, the sealant introduction aspect of the invention will now be described.

In FIG. 2A, it is seen that component 240, referred to earlier herein as the removable sealant assembly, is insertable within the new pipeline 15. This assembly is fed from the same location where the new pipeline was inserted into the old pipeline. This removable assembly will be used to uniquely introduce the sealant material that will fill the void between the old and new pipelines, thereby providing a final means for ensuring that gas will not leak through the deteriorated pipeline once gas service is re-established.

Referring now to FIG. 10, it is seen that the removable sealant assembly has not yet been introduced into the sealant introduction means. From this figure, it is important to realize that the radial ports 152 of the sealant dispersion receptacle are closed and sealed by the spring-biased gate 200 of the sealant flow control valve, thereby preventing the establishment of a fluid communication between the annular space 17, the internal passageway of apparatus 30, and of course, the internal cavity of the pipeline 15. In order to create such communicative pathway, the bias of spring 190 must be overcome so as to move valve gate 200 in a leftward direction in the figure, to a point where gate 200 is no longer covering the ports 152. In FIG. 11, it is seen that the removable sealant assembly is inserted within the receiving and retaining means 130 and the sealant introduction means, specifically into the sealant dispersion receptacle 150. An operator uses the sealant assembly 240 as the means for biasing spring 190 into a fully compressed state, thereby moving valve gate 200 leftward into internal chamber 180 of receiver housing 170 so as to open radial ports 152 relative to valve gate 200. The full compression of spring 190 is realized when feeding of the sealant tubing of the removable sealant assembly stops its further inward progression.

It is also seen that cylindrical plug 150 is now disposed within central passageway 155 and in contact with both of the O-rings so as to create internal seals which will prevent sealant material from traveling anywhere but through exit ports 152. The full compression of spring 190 leaves radially displaced holes 256 of plug 250 in alignment with radial ports 152. The compressed spring height, the length of valve gate 200, the extent between holes 256 and end face 254 of plug 256, are predetermined to ensure that holes 256 and ports 154 will always be aligned and hence in communication with each other when spring 190 is fully compressed. An operator will then lock the sealant supply tubing in place against pull-back displacement in order to guarantee the established communication between holes 256 and ports 154. The locking mechanism is not part of this invention, and is therefore not shown.

Once the sealant supply tubing is locked in place, the sealant material is pumped into the sealant tubing interior. This is done at the above-ground location where the new piping was fed into the old existing piping, which as mentioned, was at the gas meter. The sealant material flows internally through tubing 260, and into central blind bore 255 in plug 250, where it enters radially displaced holes 256, exiting the removable assembly and into radial ports 154, as indicated by the heavy dark arrow of FIG. 11A. As sealant material exits radial ports 154, the sealant is forced to change direction from that of its introduction direction and to follow a path of least restriction. As FIG. 2A illustrates, once the sealant enters annular space 17, it has to change direction back towards the meter because the stopper assembly is sealing the annular space at points 86A, 86B, 96A, 96B, as previously described. As the sealant fills the air space volume, it simultaneously purges any entrapped air from annular space 17, pushing it out from any leak locations 23, until the sealant reaches and fills those locations. As the sealant moves further backwards, any remaining air will be purged at the meter, where the sealant is first introduced. After the sealant exudes from the exposed end of new piping 15, the sealant pumping is terminated. The sealant tubing lock is then removed, and the sealant assembly is then removed from the interior of the new piping by pulling it backwards towards the meter, and completely out of the new pipeline. As the sealant assembly is removed, it should be understood that the sealant control valve also moves back to its resting and closed position as that shown and previously described with reference to FIG. 10, thereby preventing sealant from re-entering passageway 155 and the interior of pipeline 15.

The sealant is of a material which begins to set almost immediately. Thus, it is possible to even pressure test the integrity of the sealant between the old and new piping shortly after its introduction. This particular sealant is unlike those previously used, where it was typical to have cure times of several hours before pressure testing of the sealant could be performed.

Pressure testing is now performed on the sealed annular space 17 by introducing a high pressure inert gas or air into the interior of new piping 15. The pressure is held for at least 15 minutes while a pressure gauge (not shown) visually confirms that no leakdown is occurring. Once found satisfactory, the new piping 15 is again ready for receiving the high pressure gas that is on the high pressure (main) side of the seals 86A, 86B, 96A, 96B.

In order to reestablish service, a drilling tool is first inserted into the interior of new piping 15 and then through all of the assembled components comprising the apparatus of the invention, eventually reaching plastic pressure disk 68 received within end cap 62 of nosecone assembly 60. The drill bit at the end of the drilling tool is of a diameter closely matched so as to slidingly fit within the hexagonal port 54. It is also of a length where it does not have to be slid into the port 54, but can operate upon disk 68 while being stationed within central passageway 55 of compression sleeve 50. Those in the art are familiar with this type of drilling tool so no further explanation of it will be provided herein. Pressure disk 68 is then drilled-out to nearly the diameter of central passageway 65, and once completed, high pressure gas will enter through the drilled-out pressure disk, into the hexagonal port 54, and each of the respective central passageways of the sealing means, sealant introduction means, and retaining means, thereby filling new piping 15 with high pressure gas. Likewise with the alternate nosecone assembly of FIG. 8, once a drilling tool encounters and drills-out the plastic plug 233, gas enters the central passageway of the apparatus of the invention and new pipe 15. The gland assembly attached to the piping above the ground, at meter 27 is then removed, so that valve 26 can then be connected to new piping 15, thereby re-establishing user service.

The foregoing description has been provided to clearly define and completely describe the present invention. Various modifications to the apparatus method of the invention may be made. However, those types of modifications do not depart from the scope and spirit of the invention, which is described in the following claims.

We claim:

1. A pipeline renewal apparatus for insertable use in an existing gas pipeline of a gas piping system having a high pressure gas flowing therein, said apparatus facilitating insertion and sealing of a new section of pipeline in place of said existing pipeline, the existing section of pipeline having an inlet end, an outlet end, a section of leaking pipeline therebetween, and a high pressure gas flowing from said inlet towards said outlet, said apparatus having a proximal end facing said inlet end of said existing section, and a distal end facing said outlet end, wherein an annular space exists between said existing pipeline and said new pipeline when said new pipeline is inserted, comprising:

means for sealing an existing pipeline in order to terminate said flow of high pressure gas therethrough, said sealing means insertable within an existing pipeline between an inlet and a leaking section thereof, said sealing means including a central passageway therethrough, which said central passageway is adapted to be temporarily closed when said sealing means is inserted within said existing pipeline; and means for receiving and retaining a new pipeline section for renewal of said leaking section, said receiving and retaining means including a central passageway therethrough and being coupled to said sealing means such that said respective central passageways of said sealing means and said receiving and retaining means are in fluid communication;

wherein opening of said central passageway of said sealing means introduces said high-pressure gas into said new pipeline;

said means for sealing comprises a stopper assembly having a central passageway therethrough and a nosecone assembly, said nosecone assembly including means for terminating a flow of gas into said central passageway, said stopper assembly including at least one distendable member for engagement with an inside surface of an existing pipeline so as to form a seal between said apparatus and the inside surface;

said means for sealing further includes a compression sleeve and a compression nut, said compression nut rotatively coupled with said compression sleeve to form a compression assembly, said compression assembly having a central passageway and being axially movable so as to compress said distendable member, thereby causing said at least one distendable member to expand against an inside surface of said existing piping and form a seal;

said nosecone assembly comprises a hollow end cap having an internal shoulder and a punctureable pressure disk mounted on said internal shoulder.

2. The pipeline renewal apparatus of claim 1, wherein said hollow end cap has a tip end and a base end and a central passageway axially disposed therebetween, said central passageway being threaded between said base end and said internal shoulder.

3. The pipeline renewal apparatus of claim 2, wherein said end cap is coupled threadingly to said compression sleeve, thereby sealing said central passageway of said compression assembly with said pressure disk.

4. A pipeline renewal apparatus for insertable use in an existing gas pipeline of a gas piping system having a high pressure gas flowing therein, said apparatus facilitating insertion and sealing of a new section of pipeline in place of said existing pipeline, the existing section of pipeline having an inlet end, an outlet end, a section of leaking pipeline therebetween, and a high pressure gas flowing from said inlet towards said outlet, said apparatus having a proximal end facing said inlet end of said existing section, and a distal end facing said outlet end, wherein an annular space exists between said existing pipeline and said new pipeline when said new pipeline is inserted, comprising:

means for sealing an existing pipeline in order to terminate said flow of high pressure gas therethrough, said sealing means insertable within an existing pipeline between an inlet and a leaking section thereof, said sealing means including a central passageway therethrough, which said central passageway is adapted to be temporarily closed when said sealing means is inserted within said existing pipeline; and means for receiving and retaining a new pipeline section for renewal of said leaking section, said receiving and retaining means including a central passageway therethrough and being coupled to said sealing means such that said respective central passageways of said sealing means and said receiving and retaining means are in fluid communication;

wherein opening of said central passageway of said sealing means introduces said high-pressure gas into said new pipeline;

said means for sealing comprises a stopper assembly having a central passageway therethrough and a nosecone assembly, said nosecone assembly including means for terminating a flow of gas into said central passageway, said stopper assembly including at least one distendable member for engagement with an inside surface of an existing pipeline so as to form a seal between said apparatus and the inside surface;

said distendable member of said stopper assembly comprises an elastomeric sleeve received within a pair of identical collars, said elastomeric sleeve deformable upon compression so as to create a gas-tight seal between said old pipeline and said stopper assembly.

5. A pipeline renewal apparatus for insertable use in an existing gas pipeline of a gas piping system having a high pressure gas flowing therein, said apparatus facilitating insertion and sealing of a new section of pipeline in place of said existing pipeline, the existing section of pipeline having an inlet end, an outlet end, a section of leaking pipeline therebetween, and a high pressure gas flowing from said inlet towards said outlet, said apparatus having a proximal end facing said inlet end of said existing section, and a distal end facing said outlet end, wherein an annular space exists between said existing pipeline and said new pipeline when said new pipeline is inserted, comprising:

means for sealing an existing pipeline in order to terminate said flow of high pressure gas therethrough, said sealing means insertable within an existing pipeline between an inlet and a leaking section thereof, said sealing means including a central passageway therethrough, which said central passageway is adapted to be temporarily closed when said sealing means is inserted within said existing pipeline; and means for receiving and retaining a new pipeline section for renewal of said leaking section, said receiving and retaining means including a central passageway therethrough and being coupled to said sealing means such that said respective central passageways of said sealing means and said receiving and retaining means are in fluid communication;

wherein opening of said central passageway of said sealing means introduces said high-pressure gas into said new pipeline;

said means for sealing comprises a stopper assembly having a central passageway therethrough and a nosecone assembly, said nosecone assembly including means for terminating a flow of gas into said central passageway, said stopper assembly including at least one distendable member for engagement with an inside surface of an existing pipeline so as to form a seal between said apparatus and the inside surface;

each of said distendable members of said stopper assembly comprises a respective elastomeric sleeve received within a respective pair of collars, each sleeve having an inside end and an outside end, said inside ends of each sleeve received within a shared, split-ring collar, wherein said outside ends of each sleeve are received in respective, identically dimensioned collars including a second and a third collar and a second elastomeric sleeve therebetween.

6. The pipe renewal apparatus of claim 5, wherein each of said elastomeric sleeves deform into an identical double humped configuration.

7. The pipe renewal apparatus of claim 5, wherein each of said collars includes a respective undercut therein for retaining an end of said elastomeric sleeve therein, said collars preventing overriding of said sleeve onto an outside surface of each respective collar.

8. The pipe renewal apparatus of claim 5, wherein said split-ring collar is formed of a pair of conjointed half-collars, each of said half-collars including a radially disposed channel therein, said channels collectively forming a bleed hole, when said half-collars are co-jointed.

9. A pipeline renewal apparatus for insertable use in an existing gas pipeline of a gas piping system having a high pressure gas flowing therein, said apparatus facilitating insertion and sealing of a new section of pipeline in place of said existing pipeline, the existing section of pipeline having an inlet end, an outlet end, a section of leaking pipeline therebetween, and a high pressure gas flowing from said inlet towards said outlet, said apparatus having a proximal end facing said inlet end of said existing section, and a distal end facing said outlet end, wherein an annular space exists between said existing pipeline and said new pipeline when said new pipeline is inserted, comprising:

means for sealing an existing pipeline in order to terminate said flow of high pressure gas therethrough, said sealing means insertable within an existing pipeline between an inlet and a leaking section thereof, said sealing means including a central passageway therethrough, which said central passageway is adapted to be temporarily closed when said sealing means is inserted within said existing pipeline; and means for receiving and retaining a new pipeline section for renewal of said leaking section, said receiving and retaining means including a central passageway therethrough and being coupled to said sealing means such that said respective central passageways of said sealing means and said receiving and retaining means are in fluid communication;

wherein opening of said central passageway of said sealing means introduces said high-pressure gas into said new pipeline;

means for introducing a sealant through said new piping and outwardly to said annular space, said sealant introduction means coupled between said sealing means and said receiving and retaining means;

said sealant introduction means comprises a sealant control valve operable within a cylindrical receiver housing, said receiver housing comprising an inner container connected with a sealant dispersion assemblage;

said sealant control valve housing has a central passageway axially extending therethrough and a spring-biased sealant flow control gate received within said housing, which said gate has a resting and closed position and a compressed and open position.

10. The apparatus of claim 9, wherein said sealant dispersion assemblage is comprised of an outside container having an outside surface, a front end, a mid-section back end, and an axially arranged central passageway extending therebetween, said outer container having internally threaded front and back ends and a plurality of radial channels extending between said outside surface and said central passageway, said channels located at said mid-section, said front end threadingly connected to said proximal end of said inner container, said back end threadingly connected to said receiving and retaining means.

11. The apparatus of claim 10, wherein said outer container is provided within a pair of axially disposed O-rings which simultaneously engage an outside surface of said valve gate when said gate is in said resting position.

12. The apparatus of claim 11, wherein said O-rings are axially located between each respective end and said mid-section, said O-rings equidistantly spaced from said mid-section.

13. The apparatus of claim 10, wherein the central passageway of said outer container and said chamber and central passageway of said inner container are coextensive, wherein when said sealant flow control valve is in said resting and closed position, said valve gate is biased into said central passageway of said outer container so as to cover the radial channels thereof.

14. The apparatus of claim 11, wherein when said valve gate is in said compressed and open position, only one of said O-rings engages said outside surface of said valve gate.

15. The apparatus of claim 9, wherein said inner container has an outside surface, a proximal end, a distal end, and an axially arrayed, central passageway extending therebetween, said inner container further including a chamber partially coextensive with said central passageway, said chamber extending from said proximal end towards said distal end and terminating in a shoulder, said shoulder for receiving a spring which biases said gate.

16. The apparatus of claim 15, wherein said outside surface of said inner container is partially threaded at said proximal end, and said central passageway at said distal end is partially threaded, said threads threadably engaging with said proximal threaded second end of said inner container of said sealing means.

17. A pipeline sealing apparatus for fluidly sealing an existing gas pipeline of a gas piping system having a high pressure gas flowing therein, the existing pipeline having an inlet end, an outlet end, and a high pressure gas flowing from said inlet towards said outlet, said sealing apparatus insertable within said existing pipeline and having a proximal end facing said inlet end of said existing pipeline and a distal end facing said outlet end, wherein an annular space exists between said existing pipeline and said sealing apparatus, comprising:

means for temporarily terminating the flow of said high pressure gas, said flow terminating means operable from a location outside of said existing pipeline and removable therefrom;

means for re-establishing said high pressure gas flow, said re-establishing means coupled to said flow terminating means such that said flow terminating means and said flow re-establishing means are in fluid communication, wherein manipulation of said flow re-establishing means re-establishes a flow of said high pressure gas through said flow terminating means and said existing pipeline;

said flow terminating means comprises a stopper assembly having a central passageway therethrough and a nosecone assembly, said stopper assembly including at least one distendable member for engagement with an inside surface of an existing pipeline so as to form a seal between said apparatus and the inside surface, thereby terminating gas flow;

said nosecone assembly comprises a hollow end cap having an internal shoulder and said flow re-establishing means comprises a punctureable pressure disk mounted on said internal shoulder.

\* \* \* \* \*